No. 869,471. PATENTED OCT. 29, 1907.
A. A. YANKEE.
AUTOMATIC GAS GOVERNOR AND STREET PRESSURE CHANGER.
APPLICATION FILED FEB. 9, 1907.
3 SHEETS—SHEET 2.
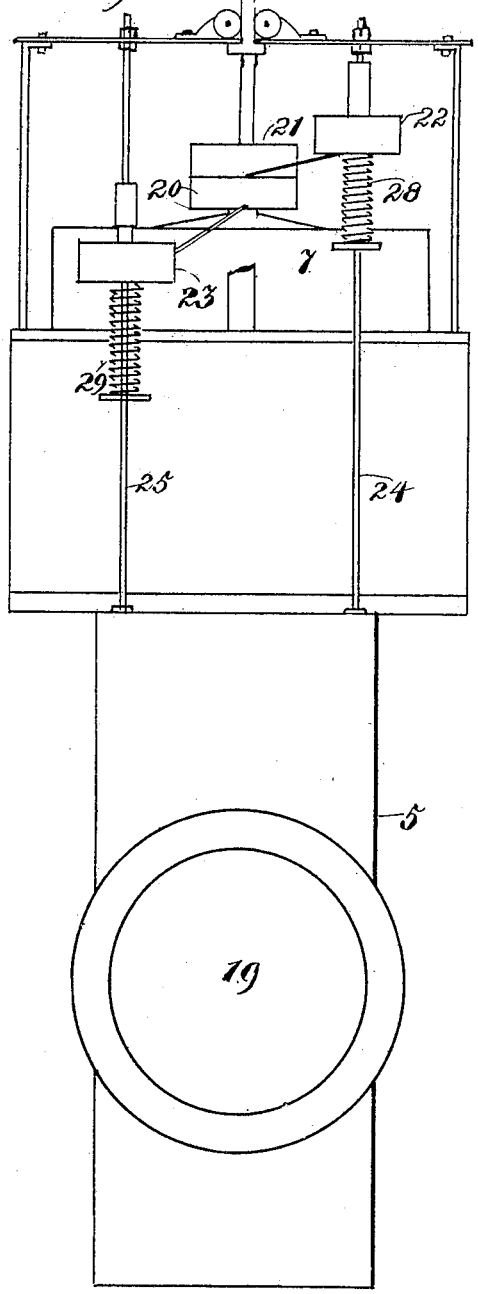

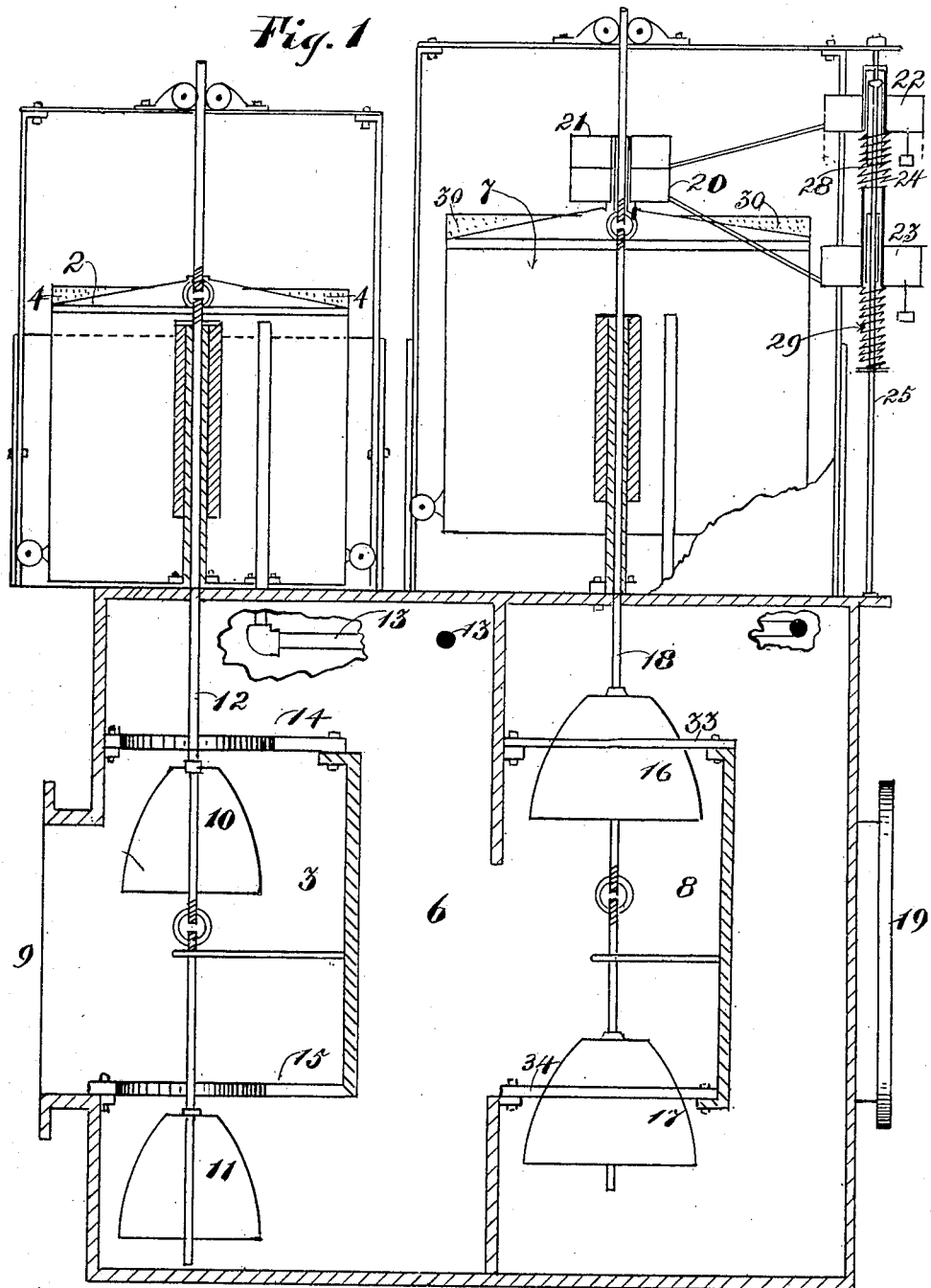

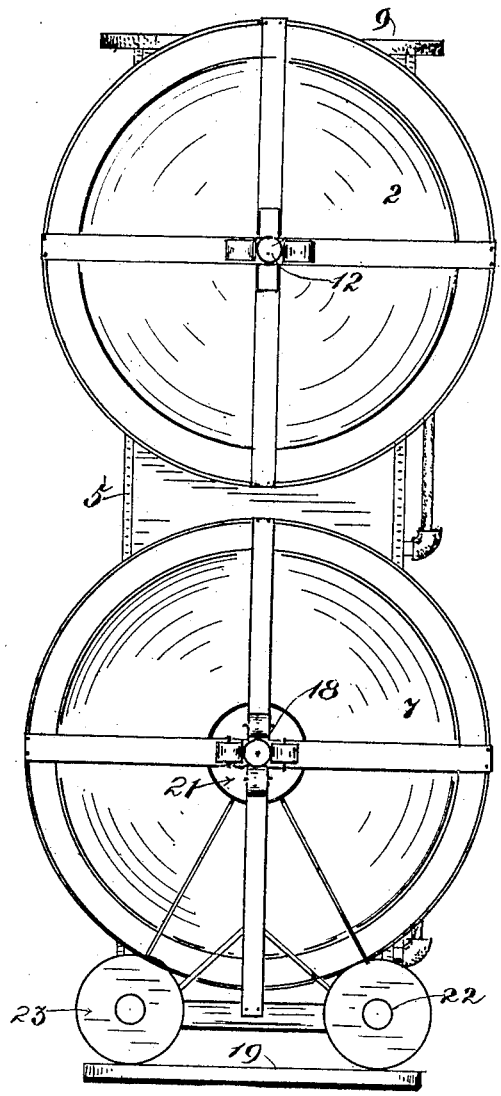

UNITED STATES PATENT OFFICE.

ANTON A. YANKEE, OF SAN FRANCISCO, CALIFORNIA.

AUTOMATIC GAS-GOVERNOR AND STREET-PRESSURE CHANGER.

No. 869,471.  Specification of Letters Patent.  Patented Oct. 29, 1907.

Application filed February 9, 1907. Serial No. 356,495.

*To all whom it may concern:*

Be it known that I, ANTON A. YANKEE, a citizen of the United States, and resident of the city and county of San Francisco, State of California, have invented certain new and useful Improvements in Automatic Gas-Governors and Street-Pressure Changers, of which the following is a specification.

My invention relates to that class of street pressure changers which maintain a given pressure at the entrance to the mains for a smaller consumption of gas during part of the day, raises said pressure for a larger consumption during other parts of the day; and has for its object to govern the required outflow of gas with greater accuracy than is done by the present devices, by dealing with the extreme variations in the pressure of the main supply tank and the use of a blower pressure.

I accomplish my object by the means illustrated in the accompanying drawing of which Figure 1, is a side sectional elevation of my device;
Fig. 2, an end sectional elevation; and Fig. 3, a plan view.

Similar numerals of reference refer to similar parts throughout the several views.

In general my invention comprises the combination with means for maintaining a fixed datum pressure in one part of my device, of means for maintaining a fixed maximum difference of pressure between this datum pressure and the entrance to the street mains during periods of minimum consumption and of automatically changing this difference of pressure to a minimum during periods of maximum consumption. By maintaining a region of fixed datum pressure within my apparatus, and arranging means for creating the required differences of pressure between said datum pressure and street main pressure, I eliminate the disturbing factor caused by variations of pressure in the main supply tank with or without its blower attachment, which is common to all gas pressure regulators hitherto devised.

For descriptive purposes I will assume my device to be divided into two parts. Part 1, at the left of the drawing Fig. 1, comprises a gas holder 2, and valve apparatus 3. Gas holder 2 is weighted by shot 4 or by any other suitable means so as to maintain a fixed pressure by means of valves 3, say one half inch above highest street pressure in the region of casing 5 marked 6. This is the fixed datum pressure referred to above. Part 2, at the right of the drawing Fig. 1, comprises a gas holder 7, controlling valve apparatus 8, in such a way as to create a maximum difference of pressure between that in the region marked 6, and that at the entrance of the street mains 19, during the hours when little gas is being used; and of creating a minimum difference of pressure between said region and said entrance during the hours when the consumption is large.
Having analyzed my device into two coöperating parts I will proceed to explain each in turn, premising my statement with the remark that both sets of valve apparatus are inclosed within casing 5.

9 is an inlet from the gas supply tank, opening into a box the outlets whereof are controlled by valves 10, 11, which are in turn controlled by holder 2 through rod 12. As aforesaid the shot 4, 4, is so adjusted in weight as to create a constant pressure of any selected degree at 6, say one half inch above highest street outlet pressure. This pressure is maintained not only against the variations in pressure of main tank, but against variations of pressure due to the use of a blower, which use is customary when main tank pressure falls below that constantly required at 6. The communication between holder 2, and space 6, is by means of pipe 13. When the influx of gas is so great as to tend to raise this pressure above the degree determined by the weight of shot 4, 4, the openings in valve plates 14, and 15, are more and more closed by valves 10, and 11, and the pressure at 6, thereby diminished; and where the pressure at 6, tends to fall below the constant pressure required, holder 2 contrariwise enlarges the valve openings by lowering valves 11, and 12.

Holder 2, is therefore actuated whether the pressure in 6, tends to be varied by variations in the pressure in the gas supply tank or in the mains. But the pressure in the street mains is similarly controlled by the holder 7, and the valves 16, and 17, through rod 18, with this difference, that holder 7, is equipped with means for producing a sub-constant minimum pressure at street mains 19, during the hours of less consumption and for automatically changing to a sub-constant maximum pressure during the hours of greater consumption. Said means comprise the mercury boxes 20, and 21, mounted on holder 7; mercury boxes 22, and 23, are mounted on rods 24, and 25, in such a manner as to have a small upward and downward movement controlled by suitable stops. Springs 28, 29, are provided which tend to move said boxes upward.

The operation of my device to automatically change from one sub-constant pressure to another is as follows: Suppose the period to be the one of minimum consumption and minimum pressure in the mains. Holder 7, is weighted by shot 30, 30, so as to maintain the floor of box 21, slightly above the level of floor 22, and a minimum pressure in 19, acting through pipe 32, is sufficient to hold the holder 7, in the desired position. But a tendency to go below said minimum pressure in 19, by reason of increased consumption brings floor of box 21, below the level of floor of box 22. Boxes 22, and 23, are filled with mercury. Consequently, mercury from box 22, flows into box 21, and it is to be noted that the flow is not slow after a certain quantity of mercury has flowed from box 22; but is sudden by reason of the overcoming of the weight of said box and the remaining mercury by spring 29, which lifts the box 22, to a higher plane and dumps the mercury therein into box 21. Whereby it takes a higher pressure in 19, to lift holder 7, and a new and higher sub-constant pressure in 19, is thereafter maintained, corresponding to the increased consumption of gas. Under these conditions small variations of pressure above and below this new sub-constant pressure are compensated for and reduced to said pressure by slight movements of valves 16, and 17. But a great decrease of pressure would cause holder 7, to drop as low as to cause mercury from box 23, to flow into box 20. Whereby a new sub-constant pressure would be created, as it would require a higher pressure to move holder upward to a given point, and diminish opening through valve plates 33, 34. Under said new condition which is that of maximum consumption, small variations are compensated for by small movements of holder 7, and valves 16, and 17. Suppose now the period of maximum consumption is over. The pressure rises in 19, and supplies the pressure required to return mercury from box 20, to box 23. Note that as soon as enough mercury enters box 23, spring 28 is depressed, box 23, drops to a lower plane and the mercury is dumped into it quickly. By this sudden dumping action the change from one sub-constant pressure state to another is accomplished quickly. When the time arrives for the maximum flow to take place, which is indicated by extreme fall of pressure in 19, the transposition of the mercury as aforesaid suddenly changes the apparatus to meet the new condition. Correspondingly when the time for minimum flow of gas arrives, the transposition of mercury is quickly accomplished by means of the boxes 22, and 23, said movements being produced by springs 27, and 28.

The adjustment of the quantity of mercury, positions of boxes, travel of valves 16, and 17, can be accurately accomplished by having a region of datum pressure to start from, in order to maintain the desired pressures in 19. This region of datum pressure is at 6, as aforesaid. By maintaining this datum pressure with practical constancy, my device will operate to automatically increase the street main pressure to a sub-constant maximum during the hours of great consumption, and to decrease it to a sub-constant minimum during the hours of minimum consumption; and will operate to maintain these sub-constant pressures respectively against small tendencies to variation in the mains.

I claim:

1. An automatic gas governor and street pressure changer, comprising a casing provided with an inlet from a gas supply tank, and an outlet to the street mains, a pressure regulating valve actuated by changes of pressure at said inlet and set to maintain a constant pressure within said casing greater than the highest street main pressure, a pressure regulating valve actuated by changes of pressure at said outlet and adapted to maintain a sub-constant maximum pressure at said outlet during the hours of greatest consumption and a sub-constant minimum pressure at said outlet during the hours of minimum consumption, and mercury boxes adapted to change automatically the set of said valve from one sub-constant street main pressure to the other at the proper time.

2. In a device of the character described, means for suddenly changing from one sub-constant street main pressure to another comprising a pressure regulating valve, a gas holder communicating with the outlet to the street mains and connected with said valve, mercury boxes mounted on said holder, other mercury boxes slidably supported on rods, flexible pipes joining said mercury boxes with the boxes on said holder, and springs connected with said rod supported mercury boxes, set so as to be compressed by the weight of said boxes when full, and acting to give a sudden upward impetus to said boxes as mercury flows therefrom.

In testimony whereof I have hereunto signed my name in the presence of two witnesses.

ANTON A. YANKEE.

Witnesses:
FRANK P. MEDINA,
E. G. MEDINA.